US011560139B2

United States Patent
Friedrich

(10) Patent No.: US 11,560,139 B2
(45) Date of Patent: Jan. 24, 2023

(54) PULSE START METHOD FOR AN INTERNAL COMBUSTION ENGINE OF A HYBRID VEHICLE

(71) Applicant: Bayerische Motoren Werke Aktiengesellschaft, Munich (DE)

(72) Inventor: Michael Friedrich, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 280 days.

(21) Appl. No.: 16/782,150

(22) Filed: Feb. 5, 2020

(65) Prior Publication Data

US 2020/0172085 A1   Jun. 4, 2020

Related U.S. Application Data

(63) Continuation of application No. PCT/EP2018/075566, filed on Sep. 21, 2018.

(30) Foreign Application Priority Data

Sep. 22, 2017  (DE) ..................... 10 2017 216 836.6

(51) Int. Cl.
*B60W 20/40* (2016.01)
*B60W 10/02* (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC . B60Y 2200/92; B60W 10/113; B60W 20/40; B60W 10/02; B60W 10/06;
(Continued)

(56) References Cited

U.S. PATENT DOCUMENTS 10,882,512 B2 *   1/2021   Kobler .................. B60K 6/547
2010/0263952 A1  10/2010   Richter et al.
(Continued)

FOREIGN PATENT DOCUMENTS

CN          103313891 A        9/2013
CN          104797449 A        7/2015
(Continued)

OTHER PUBLICATIONS

International Search Report (PCT/ISA/210) issued in PCT Application No. PCT/EP2018/075566 dated Dec. 11, 2018 with English translation (five pages).

(Continued)

Primary Examiner — Adam R Mott
Assistant Examiner — John F Hobbs, III
(74) Attorney, Agent, or Firm — Crowell & Moring LLP

(57) ABSTRACT

A hybrid drive device has an internal combustion engine, a clutch transmission which has at least one free partial transmission and a partial transmission connected to an electric machine with in each case a clutch, and at least one electric machine. In order to start the internal combustion engine, pulse energy is provided from an inertia of the clutch associated with the free partial transmission and/or a rotation in the free partial transmission.

14 Claims, 2 Drawing Sheets

(51) Int. Cl.
  *B60W 10/06* (2006.01)
  *B60W 10/08* (2006.01)
  *B60W 20/10* (2016.01)
  *B60W 20/30* (2016.01)

(52) U.S. Cl.
  CPC ............ *B60W 20/10* (2013.01); *B60W 20/30* (2013.01); *B60W 2710/021* (2013.01)

(58) Field of Classification Search
  CPC ........... B60W 2710/021; B60W 10/08; B60W 30/192; B60K 2006/4816; B60K 6/20; B60K 6/00; B60K 6/42; B60K 6/44; B60K 6/38; B60K 6/22; F16H 61/688; F16H 2312/20; Y02T 10/62
  See application file for complete search history.

(56) References Cited

U.S. PATENT DOCUMENTS

| | | |
|---|---|---|
| 2013/0337973 A1 | 12/2013 | Maass et al. |
| 2014/0195089 A1 | 7/2014 | Kobayashi et al. |
| 2014/0373675 A1 | 12/2014 | Kaltenbach et al. |
| 2015/0321658 A1* | 11/2015 | Hansson ................ B60K 6/547 180/65.265 |
| 2015/0375736 A1 | 12/2015 | Kaltenbach et al. |
| 2016/0137189 A1 | 5/2016 | Zhu et al. |
| 2017/0234253 A1* | 8/2017 | Serrano ................. F01N 11/007 123/436 |
| 2018/0244262 A1* | 8/2018 | Ruybal .................... B60K 6/48 |

FOREIGN PATENT DOCUMENTS

| | | |
|---|---|---|
| DE | 199 60 621 A1 | 6/2001 |
| DE | 10 2007 050 659 A1 | 4/2009 |
| DE | 10 2009 002 176 A1 | 12/2010 |
| DE | 10 2010 043 354 A1 | 5/2012 |
| DE | 10 2011 018 203 A1 | 10/2012 |
| DE | 11 2011 105 512 T5 | 4/2014 |
| DE | 10 2013 211 591 A1 | 12/2014 |

OTHER PUBLICATIONS

German-language Written Opinion (PCT/ISA/237) issued in PCT Application No. PCT/EP2018/075566 dated Dec. 11, 2018 (six pages).

German-language Search Report issued in counterpart German Application No. 10 2017 216 836.6 dated Feb. 26, 2019 with partial English translation (13 pages).

Chinese-language Office Action issued in Chinese Application No. 201880052125.5 dated Aug. 25, 2022 with English translation (15 pages).

* cited by examiner

PULSE START METHOD FOR AN INTERNAL COMBUSTION ENGINE OF A HYBRID VEHICLE

CROSS REFERENCE TO RELATED APPLICATIONS

This application is a continuation of PCT International Application No. PCT/EP2018/075566, filed Sep. 21, 2018, which claims priority under 35 U.S.C. § 119 from German Patent Application No. 10 2017 216 836.6, filed Sep. 22, 2017, the entire disclosures of which are herein expressly incorporated by reference.

BACKGROUND AND SUMMARY OF THE INVENTION

The invention relates to a method for operating a hybrid drive apparatus of a motor vehicle, to a hybrid drive apparatus, and to a motor vehicle.

In the case of hybrid vehicles, the internal combustion engine can be started via crank starting, an electric machine providing a positive torque via a clutch, which positive torque acts on the internal combustion engine or the crankshaft. It is also possible to start the internal combustion engine by means of a pinion starter. While the internal combustion engine is being brought to a connector rotational speed, a load request of a driver of the hybrid vehicle cannot be implemented sufficiently by the electric machine, for example. This can lead to a situation which is unacceptable for the driver. Moreover, a start of this type of the internal combustion engine requires a large amount of energy which has to be provided by the electric motor of the hybrid vehicle.

It is an object of the present invention to shorten the time duration until the beginning of a power transmission of the internal combustion engine, and to reduce the requirement of electric energy for the additional starting.

In the case of current hybridized double clutch transmissions, with a connection of the electric machine to a component transmission, problems can arise for rapid starting of a switched-off internal combustion engine when exiting from phases with a switched-off internal combustion engine. In the case of the change, in particular, from electric driving, that is to say merely by way of the drive of an electric machine, into hybrid driving, in which the vehicle drive takes place both via the electric machine and via the internal combustion engine, it can take a certain amount of time until the internal combustion engine has the required connector rotational speed. These are typically hybrid vehicles, in the case of which applications are operated in the low voltage range, that is to say below 60 V, or else in the case of hybrid vehicles with high voltage applications, that is to say greater than or equal to 60 V.

Starting of the internal combustion engine is triggered by way of a load request at the accelerator, a request when the brake pedal is released, or as a result of the general operating strategy. Here, operating strategies up to now use a suitable starting system, according to which the internal combustion engine is started, proceeding from the rotational speed 0, by means of crank starting or else via a pinion starter of the internal combustion engine. Subsequently, by way of combustion of fuel, the internal combustion engine is brought to a connector rotational speed for output, and is only then coupled to the drive train and can contribute to the acceleration of the vehicle.

A time period often occurs here, which time period can lead to functional deficits and unacceptable vehicle reactions with regard to the driver requests without a sufficient implementation of the load request of the driver and a high consumption of electric energy for bridging purposes until the internal combustion engine takes over the load.

According to the invention, the object is achieved by way of a method for operating a hybrid drive apparatus of a motor vehicle. The hybrid drive apparatus comprises an internal combustion engine, a clutch transmission, having at least one free component transmission and one electric component transmission with in each case one clutch, and at least one electric machine. The electric machine is arranged on at least one component transmission, at least one other component transmission acting without a connection of the electric machine. The method comprises the following steps: opening of the at least two clutches for switching off the internal combustion engine; driving or recuperation of the motor vehicle via the electric component transmission. Receiving of an additional starting request for the internal combustion engine. Closing of the clutch which is assigned to the free component transmission for starting of the internal combustion engine, pulse energy from an inertia of the clutch which is assigned to the free component transmission and/or a rotation in the component transmission being provided for starting of the internal combustion engine.

The free component transmission does not have a connection to the electric machine. The electric component transmission has a connection to the electric machine. The two component transmissions have in each case one clutch to the internal combustion engine, or the two component transmissions are assigned in each case one clutch to the internal combustion engine.

In some exemplary embodiments of the invention, the hybrid drive arrangement corresponds to what is known as a P2 arrangement on one of the two component transmissions of a double clutch transmission topology. The clutch transmission is configured with multiple gears and such that it can be shifted in an automated manner. The clutch transmission can have a plurality of component transmissions. At least one of the component transmissions has a connection to an electric machine and is called an electric component transmission. At least one other component transmission does not have a connection to the electric machine and is called a "free component transmission". The two component transmissions can be coupled to the internal combustion engine via in each case one clutch which is assigned to the component transmission. Here, the clutches of the component transmissions can be actuated independently of one another.

In some exemplary embodiments, the starting point of the method is the entry of the motor vehicle into a phase of driving with a switched-off internal combustion engine. Here, the at least two clutches of the at least two component transmissions (electric component transmission and free component transmission) are open, in order for it to be possible for the internal combustion engine to be switched off to a rotational speed which equals zero or approximately equals zero. During this, the drive of the motor vehicle can be brought about via that component transmission which has a connection to the electric machine. The vehicle is either driven in a purely electric manner, or is in a recuperation phase.

If a control unit of the hybrid drive apparatus then receives an additional starting request for the internal combustion engine, the free component transmission which does not have a connection to the electric machine is opened toward the output by way of disengagement of the gear (disengagement of the shifting element), and the clutch to the internal combustion engine is closed, as a result of which the internal combustion engine is started. Here, starting of the internal combustion engine takes place using pulse energy in a pulse starting method. The required energy is provided from the inertia of the masses of the free component transmission and the associated clutch, and possibly present further rotating inertias (torsional non-uniformity dampers). The rotational energy which is present in the free component transmission is used for pulse starting.

In order for it to be possible for the pulse energy to be utilized without having a reaction on the output, a shifting element which forms the gear can be opened in the free component transmission before pulse starting. This can take place by way of opening of the shifting element in the free component transmission in order to decouple with respect to the output. The opening of the shifting element can take place before the closing of the clutch which is assigned to the free component transmission.

In other words, a method or an operating strategy for a pulse starting method for the internal combustion engine starting of a hybrid vehicle is specified, for the exit from phases of the engine-off recuperation and the electric driving. In particular, the pulse starting method is used in the case of motor vehicles having a hybrid drive apparatus with a double clutch transmission.

The measures according to the invention indicate a method which is distinguished by the fact that the time duration until the beginning of the power transmission of the internal combustion engine is substantially shortened. It is made possible as a result that, in particular in the case of transmission topologies on a double clutch basis, the starting request is met more rapidly and the use of electric energy for the vehicle propulsion is restricted. Moreover, the driving comfort also increases. The customary starting systems for the internal combustion engine, such as crank starting or pinion starting, can be dispensed with or, if desired, are used as an additional starting system.

In one development, the method comprises the setting of the free component transmission to at least one gear below the gear of its electric component transmission. The setting of the free component transmission can be set in a manner which is dependent on a possibly present driver request to one gear below the electric component transmission. The component transmission (free component transmission) which is not used for driving purposes and has a connection to the output forms at least one gear below the gear in the electric component transmission by way of closing of shifting elements. The aim here is to elevate the secondary side of the clutch (which belongs to the free component transmission) to a higher rotational speed level than that of the clutch which belongs to the electric component transmission. As a result, a provision of pulse energy from the inertia of the clutch and the rotation in the free component transmission is provided, which lies at a higher level than in the electric component transmission.

In one development of the method, the setting of the gear takes place continuously. In order to provide the necessary pulse starting energy for the internal combustion engine, in each case at least one gear below the electric component transmission is set continuously in the free component transmission parallel to the above-described shifting strategy (gear in the free component transmission at least one gear below the gear in the electric component transmission) during the recuperation or the electric driving by means of the drive via the electric machine.

It is provided in one development of the method that a rotational speed difference which is provided in the free component transmission is sufficient for starting of the internal combustion engine by means of pulse energy. By way of setting of the gear in the free component transmission, which can take place continuously, it is ensured that a rotational speed difference of this type prevails in the free component transmission, from which rotational speed difference the starting of the internal combustion engine in accordance with the pulse starting method can take place at any time by way of closing of the associated clutch of the free component transmission.

In one development, the method comprises accelerating of the internal combustion engine to a rotational speed which is equal to a compression ignition rotational speed. When the additional starting request is received, the free component transmission is first of all interrupted toward the output by way of opening of a gear-forming shifting element, and subsequently the associated clutch for starting the internal combustion engine is closed. In some exemplary embodiments, the internal combustion engine is accelerated to a rotational speed which is necessary for compression ignition on the basis of the pulse energy. Subsequently, independent running up of the internal combustion engine to a synchronous rotational speed of the electric component transmission takes place.

It is provided in one development of the method that the clutch of the electric component transmission is closed if the rotational speed of the internal combustion engine is equal to a synchronous rotational speed. When the synchronous rotational speed is reached, the clutch of the electric component transmission is closed, and the propulsion of the motor vehicle can be ensured via the internal combustion engine.

In one development, the method comprises accelerating of the internal combustion engine to a rotational speed which is above a target rotational speed for connecting to the electric component transmission. When the additional starting request is received, the free component transmission is interrupted toward the output by way of opening of the gear-forming shifting element, and subsequently the associated clutch for starting the internal combustion engine is closed. In some exemplary embodiments, the pulse starting is configured in such a way that the rotational speed which is set between the connected internal combustion engine and the free component transmission is set above the target rotational speed for the connection to the electric component transmission.

One development of the method does not rule out a connection of the internal combustion engine to the free component transmission. This can be dependent on the operating strategy, however.

An optimally set pulse energy leads to pulse starting with the idling rotational speed of the internal combustion engine being reached.

It is provided in one development of the method that the driving via the electric component transmission comprises propulsion of the motor vehicle and/or recuperation of brake energy. Here, the phases of recuperation and propulsion by way of the electric machine take place via the electric component transmission.

The result of said operating strategy for the method according to the invention and the hybrid drive apparatus is the more rapid connection of the internal combustion engine to the output for a rapid implementation of driver requests and/or operationally strategic necessities. At the same time, the recuperation potentials can be increased, which recuperation potentials occur when the drag torque of the coupled internal combustion engine does not have to be overcome in brake recuperation phases.

Furthermore, a hybrid drive apparatus according to the invention of a motor vehicle is specified. The hybrid drive apparatus comprises an internal combustion engine, a clutch transmission, having at least one free component transmission and one electric component transmission with in each case one clutch, and an electric machine which is arranged on the electric component transmission. Pulse energy from the inertia of the clutch which is assigned to the free component transmission and/or rotation in the component transmission is provided for starting of the internal combustion engine.

Furthermore, a motor vehicle according to the invention, in particular a passenger motor vehicle, is specified for the application of the method, the motor vehicle having a hybrid drive apparatus which comprises an internal combustion engine, a clutch transmission and an electric machine.

Specific embodiments of the invention will now be described with reference to the appended drawings. This invention can be configured in many different forms, however, and should not be interpreted as being limited to the embodiments which are shown here; rather, said embodiments are provided, in order that this disclosure is thorough and complete, and they completely cover the scope of protection of the invention for a person skilled in the art. The terminology which is used in the detailed description of the embodiments which are shown in the appended drawings is not intended to be restrictive for the invention. Identical designations refer to identical elements in the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
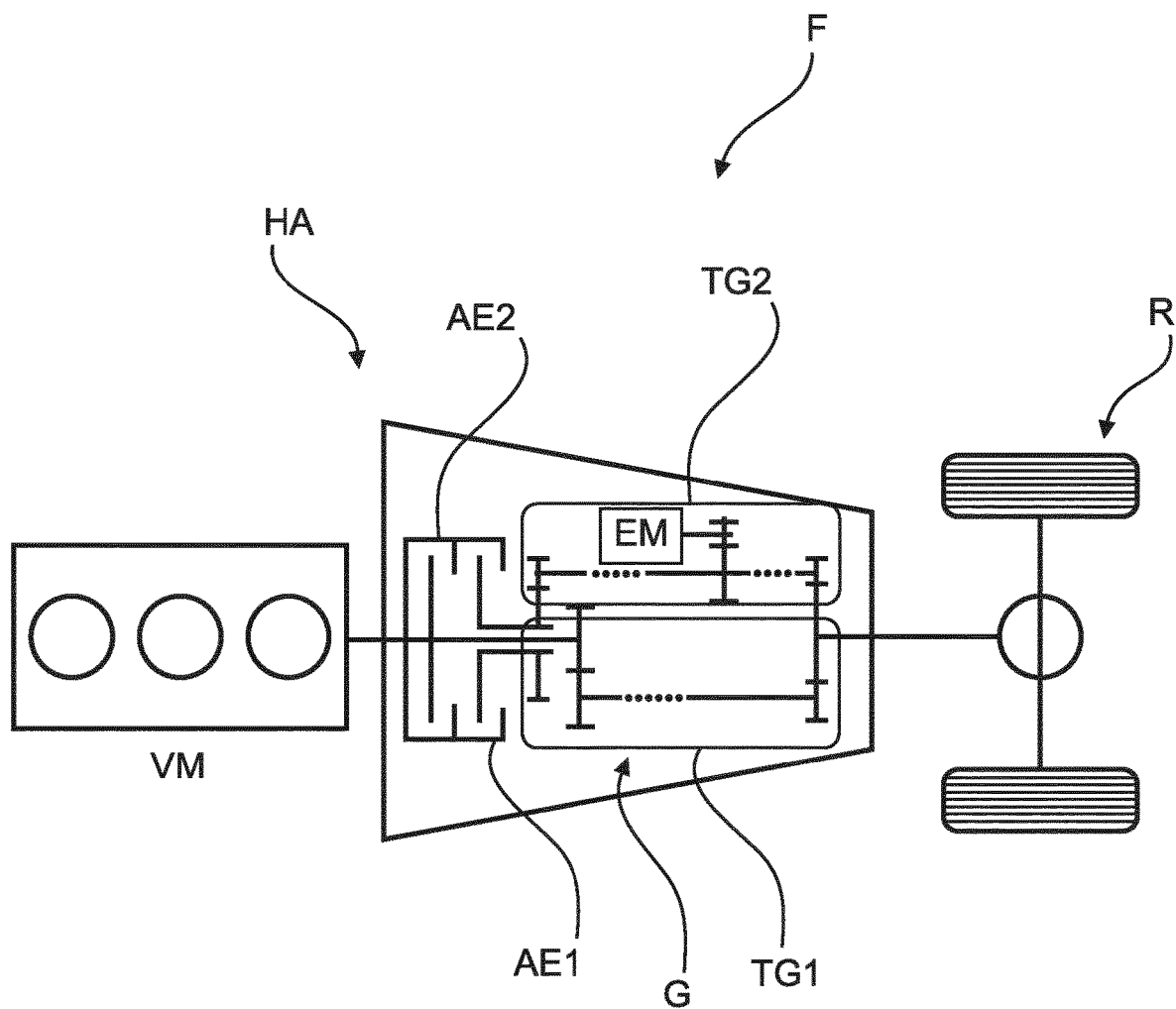
FIG. 1 shows one exemplary embodiment of a hybrid drive apparatus in a motor vehicle.

FIG. 1 diagrammatically shows a hybrid drive apparatus HA in a motor vehicle F. The hybrid drive apparatus HA has an internal combustion engine VM, a clutch transmission G and an electric machine EM. The hybrid drive apparatus HA is connected to the wheels R of the motor vehicle F. In this exemplary embodiment, the hybrid drive apparatus HA is preferably described for a vehicle with rear wheel drive. The hybrid drive apparatus HA is likewise used for vehicles with front wheel drive or all wheel drive.

The vehicle transmission is configured with multiple gears and such that it can be shifted in an automated manner. A typical topology is shown in FIG. 1, it being possible for the position of the electric machine EM on the component transmissions TG1, TG2 to vary.

In this exemplary embodiment, the clutch transmission G is a double clutch transmission which has a free component transmission TG1 and an electric component transmission TG2. The two component transmissions have a connection to the internal combustion engine via the associated clutches, and have a connection to the output of the vehicle by means of a power summation of the component transmissions. The electric machine has a connection to the electric component transmission TG2.

In the case of the described hybrid drive apparatus, it is provided that the starting of the internal combustion engine VM takes place as pulse starting. The required or necessary pulse starting energy is provided from the inertia of the masses of the clutch AE1 which is assigned to the free component transmission and/or the rotational energy in the free component transmission TG1.

To this end, the clutch AE1 first of all exhibits slip and models the torque for the internal combustion engine VM. For example, at least the engine starting torque for starting of the internal combustion engine VM is provided by way of the clutch AE1, but can be reduced as the rotational speed increases. The provided torque results in the time duration up to the beginning of a power transmission of the internal combustion engine to the output.

Figure 2:
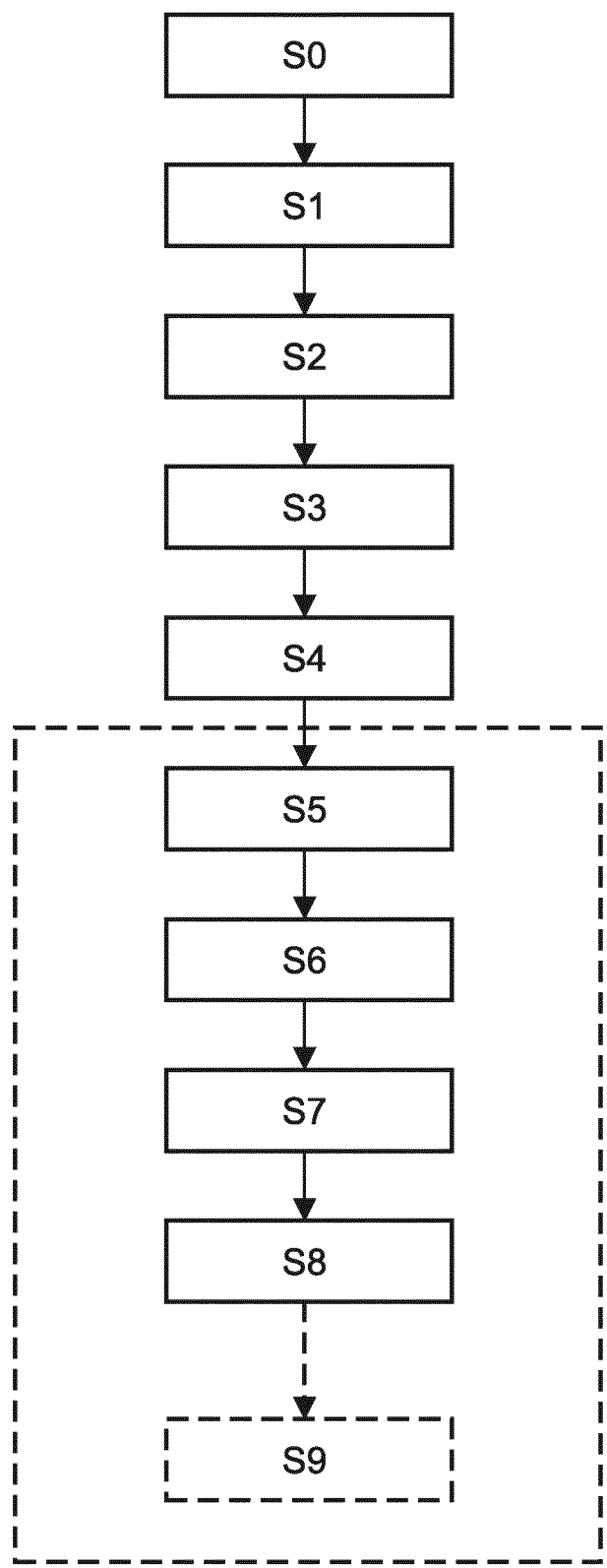
FIG. 2 shows one exemplary embodiment of a method.

To this end, the method from FIG. 2 is configured by a control unit (not shown) of the hybrid drive apparatus.

FIG. 2 shows one exemplary embodiment of the method. In this exemplary embodiment, the starting point is the entry (S0) into a phase of driving with a switched-off internal combustion engine VM. The two clutches AE1 and AE2 of the double clutch transmission are open (51), with the result that the internal combustion engine has a rotational speed 0. The drive (S2), that is to say the phases of recuperation and propulsion by way of the electric machine EM take place via the component transmission TG2 (see also FIG. 1).

In the next step (S3), the free component transmission TG1 which is not utilized for recuperation or propulsion by way of the electric machine is at the same time set to at least one gear below the gear in the component transmission TG2 by way of closing of suitable shifting elements, in order to be capable of reaction at any time. The secondary side of the clutch AE1 is elevated to a higher rotational speed level than that of the clutch AE2. The available pulse energy is at a higher level than in the case of the clutch AE2.

The control unit receives (S4) an additional starting request for the internal combustion engine VM by way of the driver or as a request of an operating strategy of the hybrid drive apparatus. For the purposes of improved clarity, the steps which begin with the additional starting request are enclosed by a dashed line in FIG. 2.

The free component transmission TG1 is first of all interrupted toward the output by way of opening (S5) of the gear-forming shifting element. The closing (S6) of the clutch AE1 for starting of the internal combustion engine then takes place. To this end, pulse energy is provided from inertia of the clutch AE1 and the rotation in the free component transmission TG1.

On the basis of the pulse energy in the masses of the free component transmission TG1 and the clutch AE1, the internal combustion engine VM is accelerated (S7) at least to a rotational speed which is necessary for compression ignition. Subsequently, independent running up (S8) of the internal combustion engine VM takes place to the synchronous rotational speed of the electric component transmission TG2 or the associated clutch AE2. When the synchronous rotational speed of the internal combustion engine with respect to the electric component transmission TG2 is reached, the clutch AE2 is closed and the propulsion can subsequently be ensured via the VM.

It can certainly be advantageous for certain applications if the pulse starting is carried out such that the rotational speed which is set between the connected internal combustion engine VM and the component transmission TG1 is set (S9)

above the target rotational speed for the connection to the component transmission TG2. This is shown by means of the dashed line in FIG. 2.

In summary, a method is configured by way of the described measures, by way of which method driver requests or operationally strategic requests of the operation of a hybrid drive apparatus can be provided in a simple way, by an internal combustion engine being started by means of pulse energy from the inertia of the clutch and/or the rotation in the component transmission.

It is to be noted that the methods, apparatuses and systems which are described in this document can be used both on their own, and in combinations with other methods, apparatuses and systems which are described in this document. Furthermore, any aspects of the methods, apparatuses and systems which are described in this document can be combined with one another in a wide variety of ways. In particular, the features of the claims can be combined with one another in a wide variety of ways.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a hybrid drive apparatus of a motor vehicle, the hybrid drive apparatus comprising an internal combustion engine, a clutch transmission having at least one free component transmission and at least one electric component transmission with, in each case, at least one clutch, and at least one electric machine, the method comprising:
   a) opening the clutch of the free component transmission and the clutch of the electric component transmission for switching off the internal combustion engine, wherein the free component transmission is not used for driving the motor vehicle by torque from the internal combustion engine or the at least one electric machine;
   b) driving the motor vehicle via the electric component transmission;
   c) receiving an additional starting request for the internal combustion engine; and
   d) closing the clutch assigned to the free component transmission for starting the internal combustion engine; wherein
   pulse energy from an inertia of the clutch assigned to the free component transmission and/or a rotation in the free component transmission is provided for starting the internal combustion engine.

2. The method according to claim 1, further comprising: setting the free component transmission to at least one gear below a gear of the electric component transmission.

3. The method according to claim 2, wherein the setting of the gear takes place continuously.

4. The method according to claim 1, wherein a rotational speed difference which is provided in the free component transmission is sufficient for starting the internal combustion engine by way of the pulse energy.

5. The method according to claim 1, further comprising: accelerating the internal combustion engine to a rotational speed which is equal to a compression ignition rotational speed.

6. The method according to claim 5, wherein the clutch of the electric component transmission is closed if the rotational speed of the internal combustion engine is equal to a synchronous rotational speed.

7. The method according to claim 1, further comprising: accelerating the internal combustion engine to a rotational speed which is above a target rotational speed for connecting to the electric component transmission.

8. The method according to claim 1, wherein the driving via the electric component transmission comprises propulsion of the motor vehicle and/or recuperation of brake energy.

9. A hybrid drive apparatus of a motor vehicle, comprising:
   an internal combustion engine;
   a clutch transmission, having at least one free component transmission and one electric component transmission with, in each case, one clutch; and
   an electric machine which is arranged on the electric component transmission, wherein
   the free component transmission is not used for driving the motor vehicle by torque from the internal combustion engine or the electric machine, and
   pulse energy from inertia of the clutch which is assigned to the free component transmission and/or rotation in the component transmission is provided for starting of the internal combustion engine.

10. A motor vehicle, comprising:
    a hybrid drive apparatus which comprises an internal combustion engine, a clutch transmission and an electric machine, wherein the clutch transmission comprises a free component transmission and an electric component transmission with, in each case, a clutch, wherein the free component transmission is not used for driving the motor vehicle by torque from the internal combustion engine or the at least one electric machine,
    wherein the hybrid drive apparatus is configured to carry out the acts of:
    a) opening the clutch assigned to the free component transmission and the clutch assigned to the electric component transmission for switching off the internal combustion engine;
    b) driving the motor vehicle via the electric component transmission;
    c) receiving an additional starting request for the internal combustion engine; and
    d) closing the clutch assigned to the free component transmission for starting the internal combustion engine; wherein
    pulse energy from an inertia of the clutch assigned to the free component transmission and/or a rotation in the free component transmission is provided for starting the internal combustion engine.

11. The motor vehicle according to claim 10, wherein the free component transmission does not have a direct connection to the electric machine.

12. The method according to claim 1, wherein the free component transmission does not have a direct connection to the electric machine.

13. The method according to claim 1, futher comprising: disengaging the free component transmission from an output prior to closing the clutch of the free component transmission.

14. The method according to claim 1, futher comprising:
   causing the clutch assigned to the free component transmission to rotate faster than the clutch of the electric component transmission.

* * * * *